United States Patent
Hu et al.

(10) Patent No.: US 10,796,219 B2
(45) Date of Patent: Oct. 6, 2020

(54) SEMANTIC ANALYSIS METHOD AND APPARATUS BASED ON ARTIFICIAL INTELLIGENCE

(71) Applicant: BAIDU ONLINE NETWORK TECHNOLOGY (BEIJING) CO., LTD., Beijing (CN)

(72) Inventors: Zejin Hu, Beijing (CN); Peixuan Shi, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 702 days.

(21) Appl. No.: 15/641,426

(22) Filed: Jul. 5, 2017

(65) Prior Publication Data

US 2018/0121783 A1    May 3, 2018

(30) Foreign Application Priority Data

Oct. 31, 2016   (CN) ............... 2016 1 0929796

(51) Int. Cl.
*G06N 5/02*    (2006.01)
*G06N 3/00*    (2006.01)
*G06F 40/30*   (2020.01)

(52) U.S. Cl.
CPC ........... *G06N 3/006* (2013.01); *G06F 40/30* (2020.01); *G06N 5/027* (2013.01)

(58) Field of Classification Search
CPC ....................................... G06F 40/30
USPC ...................................... 706/15, 45
See application file for complete search history.

(56) References Cited

U.S. PATENT DOCUMENTS

| 2004/0122653 A1* | 6/2004 | Mau | G06F 16/3329 704/2 |
| 2004/0220809 A1* | 11/2004 | Wang | G06F 40/216 704/257 |
| 2006/0271364 A1* | 11/2006 | Mirkovic | G06F 40/40 704/239 |

(Continued)

FOREIGN PATENT DOCUMENTS

| CN | 105091236 | 11/2015 |
| CN | 105137789 | 12/2015 |

(Continued)

OTHER PUBLICATIONS

SIPO, First Office Action for CN Application No. 201610929796, dated Sep. 29, 2018.

*Primary Examiner* — David R Vincent
(74) *Attorney, Agent, or Firm* — Hodgson Russ LLP

(57) ABSTRACT

The present disclosure provides a semantic analysis method and apparatus based on artificial intelligence. The method includes: matching input information to be processed with a preset semantic template, in which the preset semantic template is generated according to semantic slot information and equipment information corresponding to an application scenario; when the input information to be processed is successfully matched with the preset semantic template, converting the input information to formative data according to a target semantic template successfully matched with the input information; normalizing the formative data and generating a semantic analysis result corresponding to the input information.

11 Claims, 4 Drawing Sheets

(56) References Cited

U.S. PATENT DOCUMENTS

| | | | | |
|---|---|---|---|---|
| 2014/0257794 A1* | 9/2014 | Gandrabur | .......... | G10L 15/1822 |
| | | | | 704/9 |
| 2014/0309990 A1* | 10/2014 | Gandrabur | .............. | G06F 40/30 |
| | | | | 704/9 |
| 2015/0278195 A1* | 10/2015 | Yang | ....................... | G06F 40/30 |
| | | | | 704/9 |
| 2016/0293168 A1 | 10/2016 | Chen | | |
| 2017/0270922 A1* | 9/2017 | Fu | ........................... | G10L 17/06 |

FOREIGN PATENT DOCUMENTS

| CN | 105444332 | 3/2016 |
|---|---|---|
| CN | 105446145 | 3/2016 |
| CN | 105488032 | 4/2016 |
| CN | 105629747 | 6/2016 |

\* cited by examiner

SEMANTIC ANALYSIS METHOD AND APPARATUS BASED ON ARTIFICIAL INTELLIGENCE

This application is based on and claims priority to Chinese Patent Application No. 201610929796.8, filed on Oct. 31, 2016, the entire contents of which are incorporated herein by reference.

FIELD

The present disclosure relates to the field of information processing, and more particularly, to a semantic analysis method and apparatus based on artificial intelligence.

BACKGROUND

Artificial Intelligence is abbreviated as AI, which is a new technical science of researching and developing theories, methods, and techniques for simulating, extending and expanding human intelligence. Currently, Artificial Intelligence may be considered as a branch of computer science, which attempts to understand the substance of intelligence and generates a new kind of intelligence machine that can react in a similar way of human intelligence. Researches in the field of AI include robots, language recognition, image recognition, natural language processing, and expert systems, etc.

With developments of the Internet, semantic recognition has been widely used in more and more scenarios, for example, in the field of smart home, semantic recognition may be performed to speech information input by the user, so as to control the domestic appliance.

In related art, semantic recognition to input information is performed based on simple rules such as keyword match, the accuracy is not satisfied, for example, some instruction type text may be misjudged as meaningless text, and the semantic determination is inaccurate.

SUMMARY

The present disclosure aims to solve at least one of the above technical problems to at least some extent.

Embodiments according to a first aspect of the present disclosure provide a semantic analysis method based on artificial intelligence, and the method includes: matching input information to be processed with a preset semantic template, in which the preset semantic template is generated according to semantic slot information and equipment information corresponding to an application scenario; when the input information to be processed is successfully matched with the preset semantic template, converting the input information to formative data according to a target semantic template successfully matched with the input information; normalizing the formative data and generating a semantic analysis result corresponding to the input information.

Embodiments according to a second aspect of the present disclosure provide a semantic analysis apparatus based on artificial intelligence, including: a matching module, configured to match input information to be processed with a preset semantic template, in which the preset semantic template is generated according to semantic slot information and equipment information corresponding to an application scenario; a converting module, configured to convert the input information to formative data according to a target semantic template successfully matched to the input information, when the input information to be processed is successfully matched with the semantic template; a generating module, configured to normalize the formative data and generate a semantic analysis result corresponding to the input information.

Embodiments according to a third aspect of the present disclosure provide a semantic analysis apparatus based on artificial intelligence, including a processor and a memory configured to store instructions executable by the processor, in which the processor is configured to perform the semantic analysis method based on AI according to embodiments of the first aspect of the present disclosure by running the instruction stored in the memory.

Embodiments according to a fourth aspect of the present disclosure provide a non-transitory computer readable storage medium, when instructions stored in the storage medium are executed by a processor of a mobile terminal, the mobile terminal is caused to perform a semantic analysis method based on artificial intelligence according to embodiments of the first aspect of the present disclosure.

Embodiments according to a fifth aspect of the present disclosure provide a computer program product, when instructions stored in the computer program product are executed by a processor, a semantic analysis method based on artificial intelligence according to embodiments of the first aspect of the present disclosure is performed.

With the present disclosure, the accuracy of semantic analysis is increased, and the user experience is improved.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

Above and/or other aspects and advantages of the present disclosure will become apparent and more easily to understand from the following descriptions of the embodiments of the present disclosure with reference to the drawings.

DETAILED DESCRIPTION

Figure 1:
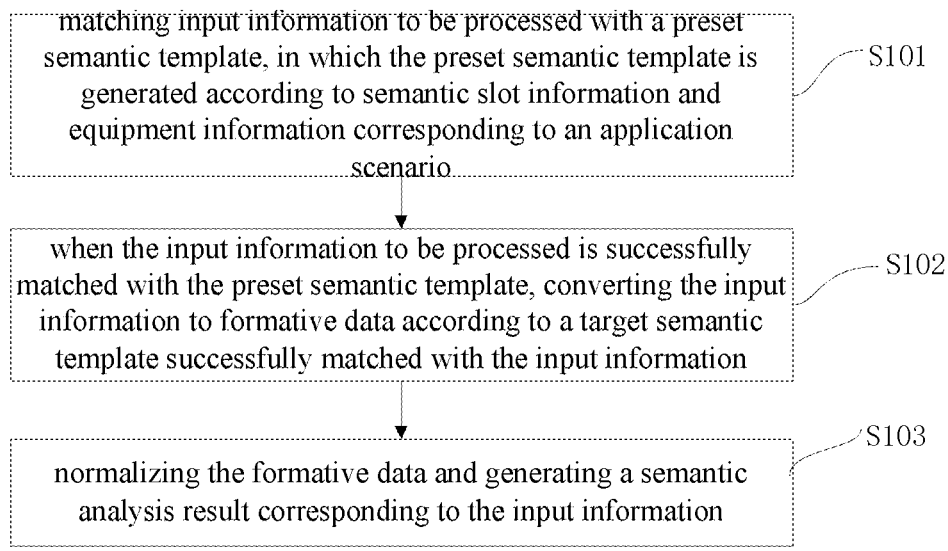
FIG. 1 is a flow chart showing a semantic analysis method based on AI according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The semantic analysis method and apparatus based on artificial intelligence according to embodiments of the present disclosure will be described below with reference to drawings.

Generally, semantic recognition function is provided in a lot of scenarios, for example, in a navigation application scenario, semanteme of speech information "I want to go to the Fuguo road" input by the user is recognized, so as to convert the semanteme to a requirement instruction "go to Fuguo road" and provide a service of navigation to the destination.

Or, in a smart home scenario, semanteme of speech information "I want to turn on the air conditioning" input by the user is recognized by means of semantic recognition, so as to convert the semanteme to a requirement instruction "turn on the air conditioning" and provide a service of turning on the air conditioning.

However, in the related art, semantic recognition is based on simple rules such as keyword matching, the accuracy of semantic recognition is unsatisfied. For example, based on keyword matching, a keyword "fan" may be recognized from input speech information "it cools slowly by the fan, use something else", and therefore an action of turning on the fan is executed. However, obviously, turning on the fan is not the actual intent of the user.

To avoid the above problems and increase the accuracy of semantic recognition, a semantic analysis method based on artificial intelligence (AI) is provided as follows.

FIG. 1 is a flow chart showing a semantic analysis method based on AI according to an embodiment of the present disclosure.

As shown in FIG. 1, the semantic analysis method based on AI includes following actions.

In block S101, input information to be processed is matched with a preset semantic template, in which the preset semantic template is generated according to equipment information and semantic slot information corresponding to an application scenario.

In detail, the semantic template is generated according to the equipment information and the semantic slot information corresponding to the application scenario, in which the equipment information includes information that can represent the equipment corresponding to the present scenario uniquely, such as an ID (identification), an equipment number, etc.

In detail, the semantic slot information may include multiple kinds of control instruction information corresponding to the present application scenario. For example, when the application scenario is a smart home application, the semantic slot information corresponding to the application scenario may include control instruction information related to the household appliance such as turning on instruction information, rising temperature instruction information, turning off instruction information, and so on.

For another example, when the application scenario is a navigation application, the semantic slot information corresponding to the application scenario may include control instruction information related to navigation function such as turning on instruction information, going straight instruction information, turning right instruction information, turning off instruction information, and so on.

Moreover, according to different application scenarios, the above semantic slot information may be of the same type or may be of multiple different types.

For example, if the application scenario is a smart home application, then the semantic slot information corresponding to the application scenario may include common slot information for multiple equipments such as "turn on", "turn off" which can be used by multiple equipments such as refrigerator and air conditioning, and special slot information for a single equipment such as special slot information "shake head" for a fan.

That is to say, the semantic template may include multiple combinations of semantic slot information and equipment information corresponding to the present application scenario, for example, semantic slot information "turn on", "timer turn off", "raise the temperature 3 degrees" for an air conditioning, and semantic slot information "turn on", "shake head", "turn off" for a fan.

Furthermore, by matching the input information to be processed with the semantic template generated according to the equipment information and the semantic slot information corresponding to the application scenario, semanteme of the input information can be exactly analyzed, in which specific operating instruction in the input information is obtained by matching according to the semantic slot information and specific operating object is obtained by matching according to the equipment information.

In detail, the input information to be processed may include text information, speech information, etc., and when the input information to be processed is non-text information such as the speech information, the non-text information is converted to text information first before the input information to be processed is matched with the semantic template.

In block S102, when the input information to be processed is successfully matched with the semantic template, the input information is converted to formative data according to a target semantic template successfully matched with the input information.

In detail, when the input information is successfully matched with the semantic template, it means semantic information of the present input information is in accordance with semanteme in the semantic template, i.e. the semanteme of the present input information is parsed out.

Furthermore, in order to make it easy for related equipment to operate according to the input information, the input information is converted to formative data according to the target semantic template successfully matched with the input information.

In detail, the formative data represents the input information in a standard format, in which the input information is converted and stored according to particular content type (e.g. content showing equipment type, content showing operation type, etc.). For example, according to the successfully matched target semantic template, input information "turn on the air conditioning" may be converted to "equipment type: air conditioning", "operation type: turn on" and stored.

In block S103, the formative data is normalized and a semantic analysis result corresponding to the input information is generated.

In detail, the formative data is normalized and a semantic analysis result corresponding to the input information is generated, so that related equipment may work according to the semantic analysis result.

In an embodiment, the normalization operation is used to convert the formative data to a data structure recognizable by the related equipment, for example, the formative data is converted to floating-point data recognizable by the related equipment, or the formative data is converted to data with 32-bit storage length recognizable by the related equipment. Thus, the generated semantic analysis result corresponding to the input information can be recognized and executed by the related equipment.

In summary, with the semantic analysis method based on AI according to embodiments of the present disclosure, the input information to be processed is matched with a preset semantic template; when the input information to be processed is successfully matched with the semantic template, the input information is converted to formative data according to a target semantic template successfully matched with the input information; then the formative data is normalized and a semantic analysis result corresponding to the input information is generated. Therefore, the accuracy of semantic analysis is increased and the user experience is improved.

Based on above embodiments, it should be understood that, in practice, content of the input information to be processed may be of various types, but the preset semantic template may just include the combinations of the semantic slot information and the equipment information partially corresponding the application scenario. Thus, in some application scenarios, the input information to be processed may be not matched with the preset semantic template.

For making a more comprehensive illustration of the semantic analysis method based on AI according to embodiments of the present disclosure, a detailed description of the semantic analysis process when the input information to be processed is not matched with the preset semantic template is provided as follows.

Figure 2:
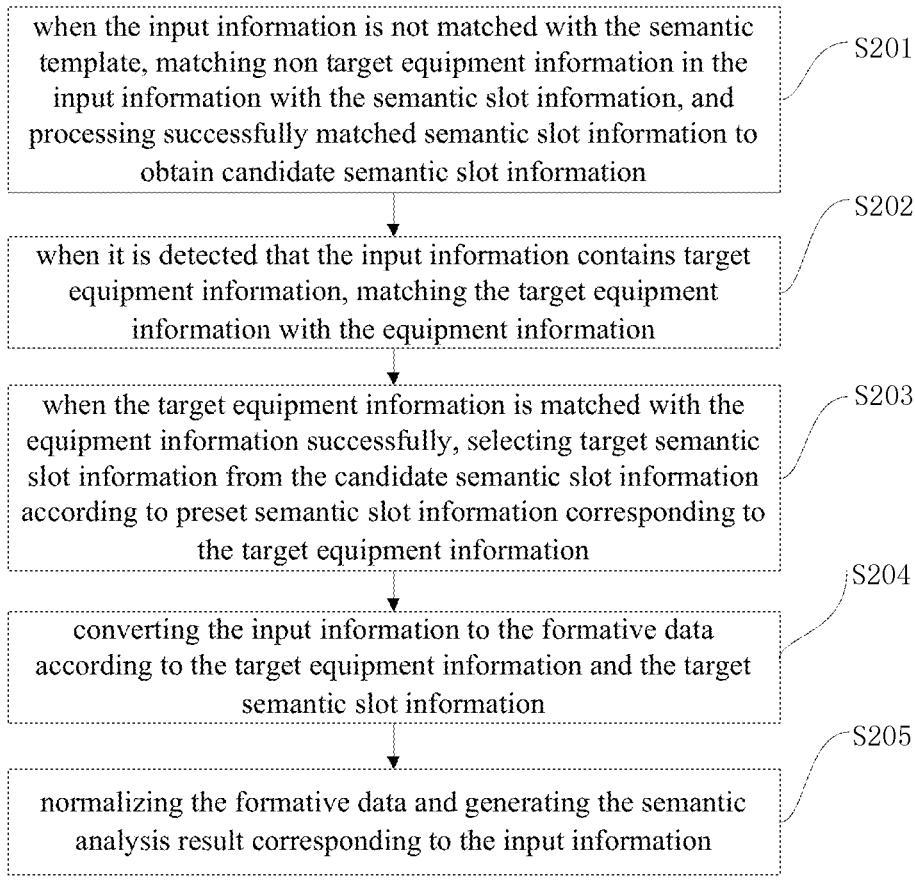
FIG. 2 is a flow chart showing a semantic analysis method based on AI according to another embodiment of the present disclosure.

FIG. 2 is a flow chart showing a semantic analysis method based on AI according to an embodiment of the present disclosure. As shown in FIG. 2, after the above block S101, the semantic analysis method based on AI may further include following actions.

In block S201, when the input information is not matched with the semantic template, non target equipment information in the input information is matched with the semantic slot information, and successfully matched semantic slot information is processed to obtain candidate semantic slot information.

In detail, when the input information is not matched with the preset semantic template, it means the input information does not contain the combination of the semantic slot information and the equipment information corresponding to the application scenario. Therefore, non target equipment information in the input information is recognized separately, that is, non target equipment information in the input information is matched with the semantic slot information and successfully matched semantic slot information is processed to obtain candidate semantic slot information.

For example, the non target information included in the input information is "please help to raise . . . ", then the non target equipment information in the input information is matched with the semantic slot information, and successfully matched semantic slot information is processed to obtain candidate semantic slot information "raise the temperature", "raise the luminance", etc.

In block S202, when it is detected that the input information contains target equipment information, then the target equipment information is matched with the equipment information.

It should be understood that in some scenarios, the input information contains target equipment information such as "please help to raise the temperature of the air conditioning", and therefore the target equipment information could be matched with the equipment information so as to identify the equipment object the user wants to operate.

In detail, the above target equipment information may include information that can represent the equipment uniquely, such as an ID (identification), an equipment number, etc.

In block S203, when the target equipment information is successfully matched with the equipment information, target semantic slot information is selected from the candidate semantic slot information according to preset semantic slot information corresponding to the target equipment information.

In detail, for a target equipment, the corresponding semantic slot information may be preset in advance. For example, the semantic slot information corresponding to an air conditioning (target equipment) may be preset as "raise the temperature", "timer turn off", "refrigeration mode", etc. Thus, when the target equipment information is successfully matched with the equipment information, the target equipment of the present input information is determined.

Therefore, the target semantic slot information is selected from the candidate semantic slot information according to the preset semantic slot information corresponding to the target equipment information.

For example, assuming the candidate semantic slot information includes "raise the temperature" and "raise the luminance", while the target equipment information is successfully matched with air conditioning equipment information, and the semantic slot information corresponding to the air conditioning includes the above "raise the temperature", then the target semantic slot information "raise the temperature" is selected from "raise the temperature" and "raise the luminance".

In another embodiment of the present disclosure, when the target equipment information is not matched with the equipment information, that means the equipment information included in the present input information does not exist in the present scenario, and thus related equipment can not be controlled according to the input information, and therefore semantic analysis failure information is fed back.

In some embodiments, according to different application scenarios, feeding back the semantic analysis failure information may be feeding back a speech prompt, a vibration feedback, a buzzing feedback, an alarm light twinkling feedback, etc.

In block S204, the input information is converted to formative data according to the target equipment information and the target semantic slot information.

In block S205, the formative data is normalized and a semantic analysis result corresponding to the input information is generated.

In detail, when the target equipment information and the target semantic slot information are obtained, the input information is converted to formative data according to the target equipment information and the target semantic slot information, and the formative data is normalized and the semantic analysis result corresponding to the input information is generated.

Based on above embodiments, it should be understood that, in practice, the input information may just include a certain function requirement of the user but does not include the target equipment performing the function. Therefore, it needs to perform different operations according to particular contents contained in the input information, which is descried in detail below.

Figure 3:
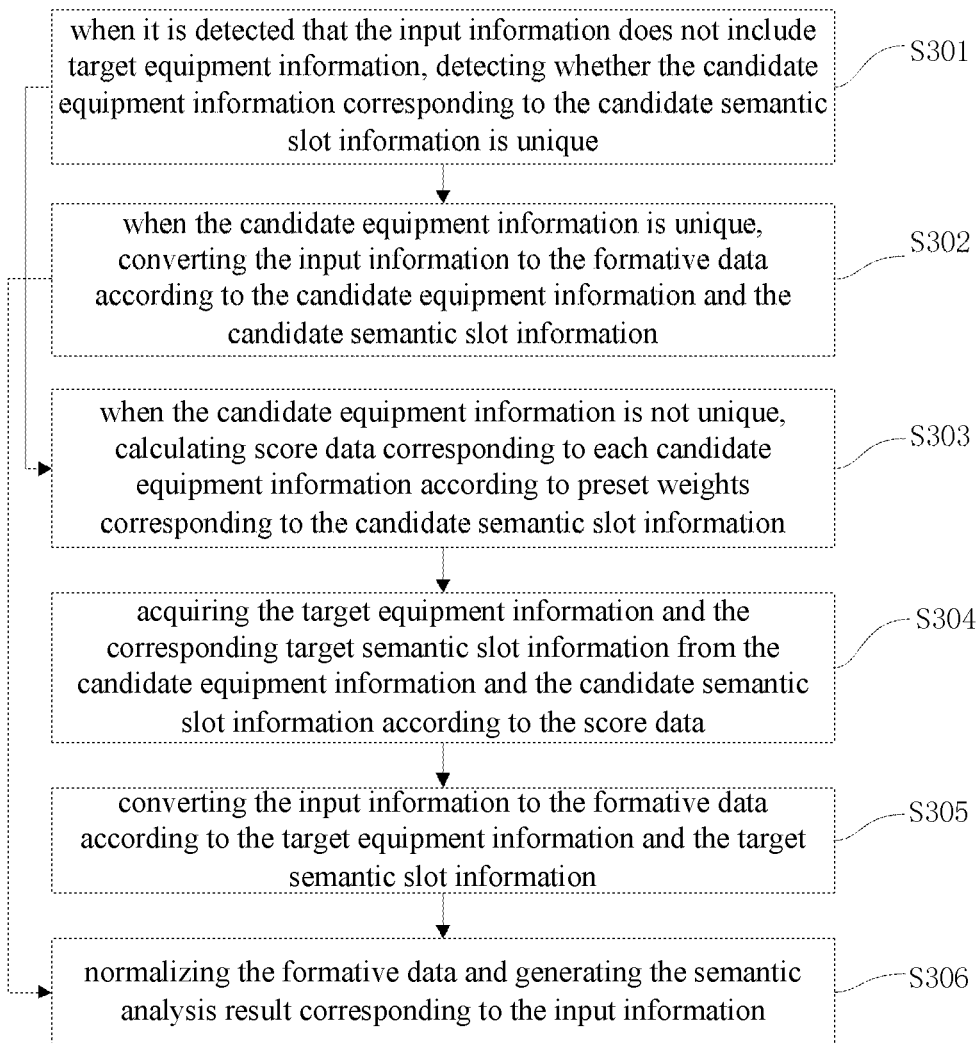
FIG. 3 is a flow chart showing a semantic analysis method based on AI according to yet another embodiment of the present disclosure.

FIG. 3 is a flow chart showing a semantic analysis method based on AI according to yet another embodiment of the present disclosure. As shown in FIG. 3, after the above block S201, the semantic analysis method based on AI includes following actions.

In block S301, when it is detected that the input information does not include the target equipment information, it is detected whether the candidate equipment information corresponding to the candidate semantic slot information is unique.

In detail, in some scenarios, the input information to be processed only contains non target equipment information (information irrelevant to target equipment), and the candidate semantic slot information matched with the non target equipment information directs to multiple candidate equipments. For example, in the smart home scenario, for the candidate semantic slot information "raise the temperature", since the operation of raising the temperature may be performed by multiple equipments in the present scenario, including the "air conditioning" and the "refrigerator", the candidate semantic slot information "raise the temperature" may correspond to multiple candidate equipment information.

However, in some scenarios, although the input information to be processed only contains non target equipment information, the candidate semantic slot information matched with the non target equipment information directs to only one candidate equipment. For example, in the smart home scenario, for the candidate semantic slot information "start shaking head", since the operation of shaking head can be performed only by the fan in the present scenario, the candidate semantic slot information "start shaking head" corresponds to unique candidate equipment information.

Therefore, when it is detected that the input information does not include the target equipment information, it is determined whether the candidate equipment information corresponding to the candidate semantic slot information is unique.

In black S302, when the candidate equipment information is unique, the input information is converted to formative data according to the candidate equipment information and the candidate semantic slot information.

In detail, when the candidate equipment information is unique, the candidate equipment information directs to the unique target equipment information, such that the input information is converted to formative data according to the candidate equipment information and the candidate semantic slot information, making it convenient to perform semantic analysis to the formatted data.

In block S303, when the candidate equipment information is not unique, score data corresponding to each candidate equipment information is calculated according to preset weights corresponding to the candidate semantic slot information.

In block S304, target equipment information and corresponding target semantic slot information are acquired from the candidate equipment information and the candidate semantic slot information according to the score data.

In detail, according to functions corresponding to different kinds of equipment, the weights corresponding to different equipment information may be set in advance for different semantic slot information, in which the equipment with a relatively higher function correlation corresponds to a higher weight, and the equipment with a relatively lower function correlation corresponds to a lower weight.

For example, in the smart home application scenario, for the semantic slot information "start the refrigeration mode", the related equipment information includes the air conditioning, the refrigerator, etc. The refrigerator is always in a refrigeration mode, and it seldom needs to control the refrigerator to enter into the refrigeration mode in practice, while the air conditioning includes multiple operation modes such as a refrigeration mode, a heating mode, and a dehumidification mode, and in many application scenarios, the user needs to control the air conditioning to start the refrigeration mode. Thus, for the semantic slot information "start the refrigeration mode", the air conditioning may be set with a higher weight, while the refrigerator is set with a lower weight.

Therefore, when the candidate equipment information is not unique, the score data corresponding to each candidate equipment information is calculated according to preset weights corresponding to the candidate semantic slot information, and the target equipment information and the corresponding target semantic slot information are acquired from the candidate equipment information and the candidate semantic slot information according to the score data.

In block S305, the input information is converted to formative data according to the target equipment information and the target semantic slot information.

In detail, when the target equipment information and the target semantic slot information are acquired, the input information is converted to formative data according to the target equipment information and the target semantic slot information, such that it is convenient to process the formatted data and control the corresponding equipment.

In block S306, the formative data is normalized and a semantic analysis result corresponding to the input information is generated.

In detail, the formative data is normalized and the semantic analysis result corresponding to the input information is generated, such that related equipment is controlled according to the intent of the user, to perform a corresponding functional operation according to the semantic analysis result.

In summary, with the semantic analysis method based on AI according to embodiments of the present disclosure, when the input information to be processed is not matched with the semantic template, the input information is processed according to its particular content so as to realize the semantic analysis and control the related equipment to perform corresponding operation according to the semantic analysis result. Thus, the accuracy of semantic analysis is further increased and the user experience is improved.

Figure 4:
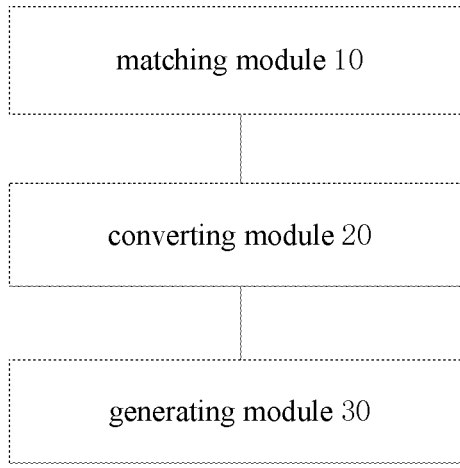
FIG. 4 is a block diagram illustrating a semantic analysis apparatus based on AI according to an embodiment of the present disclosure.

In order to realize the above embodiments, a semantic analysis apparatus based on AI is also provided in the present disclosure. FIG. 4 is a block diagram illustrating a semantic analysis apparatus based on AI according to an embodiment of the present disclosure. As shown in FIG. 4, the semantic analysis apparatus based on AI includes a matching module 10, a converting module 20 and a generating module 30.

The matching module 10 is configured to match input information to be processed with a preset semantic template, in which the preset semantic template is generated according to semantic slot information and equipment information corresponding to an application scenario.

In detail, when the application scenario is a smart home application, the semantic slot information corresponding to the application scenario may include common semantic slot information and special semantic slot information.

The converting module 20 is configured to, when the input information to be processed is successfully matched with the semantic template, convert the input information to formative data according to a target semantic template successfully matched with the input information.

The generating module 30 is configured to normalize the formative data and generate a semantic analysis result corresponding to the input information.

It should be noted that, above illustration and description of the semantic analysis method based on AI can also be applied to the semantic analysis apparatus based on AI in embodiments of the present disclosure, and thus details of the semantic analysis apparatus based on AI will not be elaborated here.

In summary, with the semantic analysis apparatus based on AI according to embodiments of the present disclosure, the input information to be processed is matched with a preset semantic template; when the input information to be processed is successfully matched with the semantic template, the input information is converted to formative data according to a target semantic template successfully matched with the input information; then the formative data is normalized and a semantic analysis result corresponding to the input information is generated. Thus, the accuracy of semantic analysis is increased and the user experience is improved.

Figure 5:
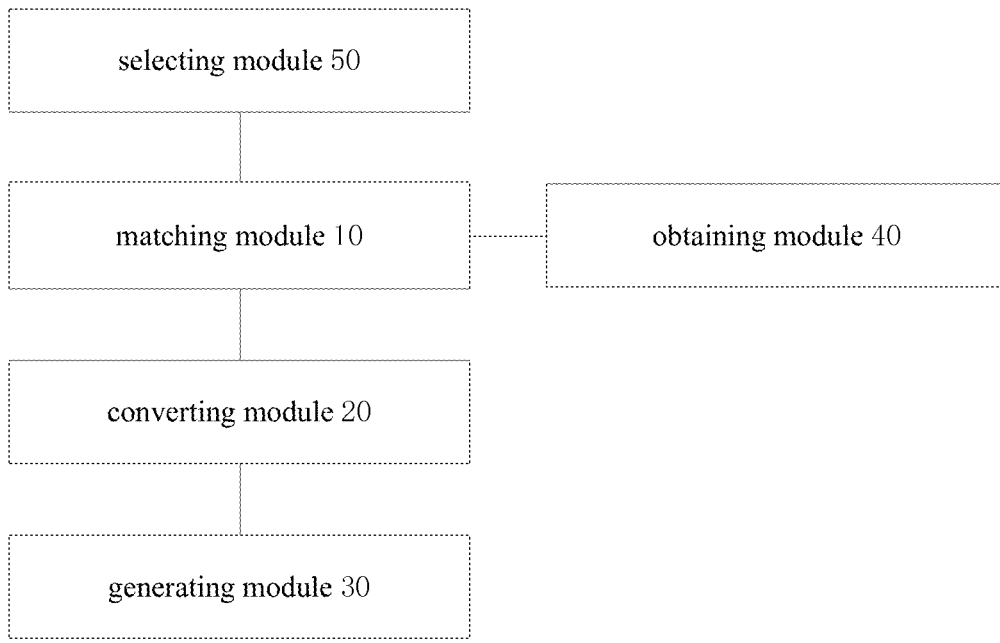
FIG. 5 is a block diagram illustrating a semantic analysis apparatus based on AI according to another embodiment of the present disclosure.

FIG. 5 is a block diagram illustrating a semantic analysis apparatus based on AI according to another embodiment of the present disclosure. As shown in FIG. 5, on the basis of FIG. 4, the semantic analysis apparatus based on AI further includes an obtaining module 40 and a selecting module 50.

In an embodiment, the matching module 10 is further configured to, match non target equipment information in the input information with the semantic slot information, when the input information is not matched with the semantic template.

The obtaining module 40 is configured to process successfully matched semantic slot information to obtain candidate semantic slot information.

In an embodiment, the matching module is configured to, match target equipment information to the equipment information when it is detected the input information contains the target equipment information.

The selecting module 50 is configured to, when the target equipment information is matched with the equipment information successfully, select target semantic slot information from the candidate semantic slot information according to preset semantic slot information corresponding to the target equipment information.

Figure 6:
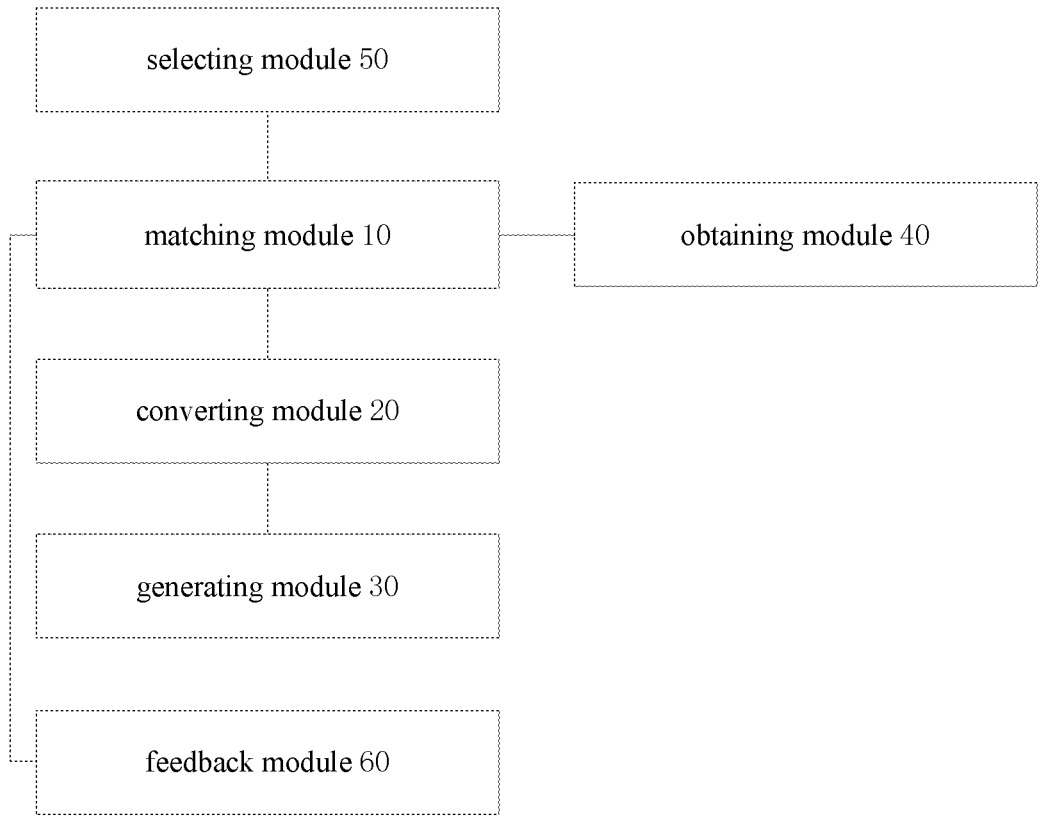
FIG. 6 is a block diagram illustrating a semantic analysis apparatus based on AI according to yet another embodiment of the present disclosure.

FIG. 6 is a block diagram illustrating a semantic analysis apparatus based on AI according to yet another embodiment of the present disclosure. In an embodiment, as shown in FIG. 6, on the basis of FIG. 5, the semantic analysis apparatus based on AI further includes a feedback module 60.

In detail, the feedback module 60 is configured to feed back semantic analysis failure information when the target equipment information is not matched with the equipment information.

The converting module 20 is configured to convert the input information to formative data according to the target equipment information and the target semantic slot information.

The generating module 30 is configured to normalize the formative data and generate a semantic analysis result corresponding to the input information.

Figure 7:
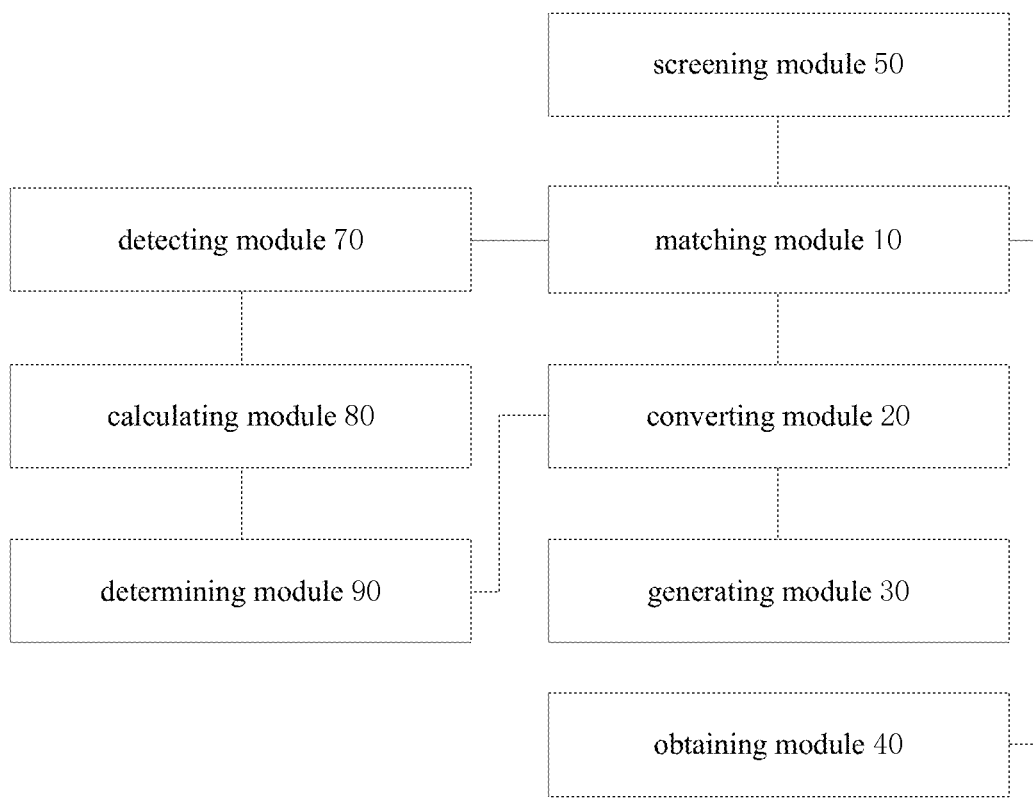
FIG. 7 is a block diagram illustrating a semantic analysis apparatus based on AI according to still yet another embodiment of the present disclosure.

FIG. 7 is a block diagram illustrating a semantic analysis apparatus based on AI according to still yet another embodiment of the present disclosure. As shown in FIG. 7, on the basis of FIG. 5, the semantic analysis apparatus based on AI further includes a detecting module 70, a calculating module 80, and a determining module 90.

In detail, the detecting module 70 is configured to detect whether the candidate equipment information corresponding to the candidate semantic slot information is unique when the input information does not include target equipment information.

In an embodiment, the converting module 20 is configured to convert the input information to formative data according to the candidate equipment information and the candidate semantic slot information when the candidate equipment information is unique.

The generating module 30 is configured to normalize the formative data and generate a semantic analysis result corresponding to the input information.

The calculating module 80 is configured to calculate score data corresponding to each candidate equipment information according to preset weights corresponding to the candidate semantic slot information, when the candidate equipment information is not unique.

The determining module 90 is configured to acquire the target equipment information and the corresponding target semantic slot information from the candidate equipment information and the candidate semantic slot information according to the score data.

In an embodiment, the converting module 20 is configured to convert the input information to formative data according to the target equipment information and the target semantic slot information.

The generating module 30 is configured to normalize the formative data and generate a semantic analysis result corresponding to the input information.

It should be noted that, above illustration and description of the semantic analysis method based on AI is also applicable to the semantic analysis apparatus based on AI in embodiments of the present disclosure, and thus details of the semantic analysis apparatus based on AI will not be elaborated here.

In summary, with the semantic analysis apparatus based on AI according to embodiments of the present disclosure, when the input information to be processed is not matched with the semantic template, the input information is processed according to its particular content so as to realize the semantic analysis and control the related equipment to perform corresponding operation according to the semantic analysis result. Thus, the accuracy of semantic analysis is further increased and the user experience is improved.

Embodiments of the present disclosure also provide a terminal. The terminal includes a processor and a memory configured to store instructions executable by the processor. The processor is configured to perform the semantic analysis method based on AI according to embodiments of the present disclosure by running the instructions stored in the memory.

Embodiments of the present disclosure also provide a non-transitory computer-readable storage medium having instructions stored therein. When the instructions are executed by a processor, the processor is caused to perform the semantic analysis method based on AI according to embodiments of the present disclosure.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in a electric manner, and then the programs may be stored in the computer memories.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

Although embodiments of present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A semantic analysis method based on artificial intelligence, comprising:

matching input information to be processed with a preset semantic template, wherein, the preset semantic template is generated according to semantic slot information and equipment information corresponding to an application scenario;

when the input information to be processed is successfully matched with the preset semantic template, converting the input information to formative data according to the semantic template;

normalizing the formative data into a data structure that is recognizable by target equipment, and generating a semantic analysis result corresponding to the input information;

when the input information is not matched with the semantic template, matching non target equipment information in the input information with the semantic slot information, and processing successfully matched semantic slot information to obtain candidate semantic slot information;

when the input information contains target equipment information, matching the target equipment information with the equipment information;

when the target equipment information is successfully matched with the equipment information, selecting target semantic slot information from the candidate semantic slot information according to preset semantic slot information corresponding to the target equipment information; and converting the input information to the formative data according to the target equipment information and the target semantic slot information.

2. The method according to claim 1, wherein, the semantic slot information corresponding to the application scenario comprises:

common semantic slot information, which corresponds to semantic slot information related to multiple equipment; and special semantic slot information, which corresponds to semantic slot information that is unique to a single equipment.

3. The method according to claim 1, further comprising:
when the target equipment information is not matched with the equipment information, feeding back semantic analysis failure information.

4. The method according to claim 1, further-comprising:
when the input information does not include the target equipment information, detecting whether candidate equipment information corresponding to the candidate semantic slot information is unique;
when the candidate equipment information is unique, converting the input information to the formative data according to the candidate equipment information and the candidate semantic slot information.

5. The method according to claim 4, further comprising:
when the candidate equipment information is not unique, calculating score data corresponding to each candidate equipment information according to preset weights corresponding to the candidate semantic slot information;
acquiring the target equipment information and the corresponding target semantic slot information from the candidate equipment information and the candidate semantic slot information according to the score data;
converting the input information to the formative data according to the target equipment information and the target semantic slot information.

6. A semantic analysis apparatus based on artificial intelligence, comprising:
a processor; and
a memory, configured to store one or more software modules executable by the processor,
wherein the one or more software modules comprise:
a matching module, configured to match input information to be processed with a preset semantic template, wherein, the preset semantic template is generated according to semantic slot information and equipment information corresponding to an application scenario;
a converting module, configured to convert the input information to formative data according to the preset semantic template, when the input information to be processed is successfully matched with the semantic template;
a generating module, configured to normalize the formative data into a data structure that is recognizable by target equipment, and generate a semantic analysis result corresponding to the input information;
wherein the one or more software modules further comprise an obtaining module and a selecting module, wherein
the matching module is further configured to match non target equipment information in the input information with the semantic slot information, when the input information is not matched with the semantic template;
the obtaining module is configured to process successfully matched semantic slot information to obtain candidate semantic slot information;
the matching module is further configured to match target equipment information with the equipment information, when the input information contains the target equipment information;
the selecting module is configured to select target semantic slot information from the candidate semantic slot information according to preset semantic slot information corresponding to the target equipment information, when the target equipment information is matched with the equipment information successfully;
the converting module is configured to convert the input information to the formative data according to the target equipment information and the target semantic slot information.

7. The apparatus according to claim 6, wherein, the semantic slot information corresponding to the application scenario comprises:
common semantic slot information, which corresponds to semantic slot information related to multiple equipment; and special semantic slot information, which corresponds to semantic slot information that is unique to a single equipment.

8. The apparatus according to claim 6, wherein the one or more software modules further comprise:
a feedback module, configured to feed back semantic analysis failure information when the target equipment information is not matched with the equipment information.

9. The apparatus according to claim 6, wherein the one or more software modules further comprise a detecting module, wherein
the detecting module is configured to detect whether candidate equipment information corresponding to the candidate semantic slot information is unique when the input information does not include the target equipment information;
the converting module is configured to convert the input information to the formative data according to the candidate equipment information and the candidate semantic slot information, when the candidate equipment information is unique.

10. The apparatus according to claim 9, wherein the one or more software modules further comprise a calculating module and a determining module, wherein
the calculating module is configured to calculate score data corresponding to each candidate equipment information according to preset weights corresponding to the candidate semantic slot information, when the candidate equipment information is not unique;
the determining module is configured to acquire the target equipment information and the corresponding target semantic slot information from the candidate equipment information and the candidate semantic slot information according to the score data;
the converting module is configured to convert the input information to formative data according to the target equipment information and the target semantic slot information.

11. A non-transitory computer-readable storage medium, configured to store instructions that, when executed by a processor of a terminal, cause the terminal to perform a semantic analysis method based on artificial intelligence, the method comprising:
matching input information to be processed with a preset semantic template, wherein, the preset semantic template is generated according to semantic slot information and equipment information corresponding to an application scenario;
when the input information to be processed is successfully matched with the preset semantic template, converting the input information to formative data according to the semantic template;
normalizing the formative data into a data structure that is recognizable by target equipment, and generating a semantic analysis result corresponding to the input information;

when the input information is not matched with the semantic template, matching non target equipment information in the input information with the semantic slot information, and processing successfully matched semantic slot information to obtain candidate semantic slot information;

when the input information contains target equipment information, matching the target equipment information with the equipment information;

when the target equipment information is successfully matched with the equipment information, selecting target semantic slot information from the candidate semantic slot information according to preset semantic slot information corresponding to the target equipment information; and converting the input information to the formative data according to the target equipment information and the target semantic slot information.

\* \* \* \* \*